(12) United States Patent
Hazlebeck

(10) Patent No.: US 6,519,926 B2
(45) Date of Patent: Feb. 18, 2003

(54) HYDROTHERMAL CONVERSION AND SEPARATION

(75) Inventor: David A. Hazlebeck, El Cajon, CA (US)

(73) Assignee: General Atomics, San Diego, CA (US)

( * ) Notice: Subject to any disclaimer, the term of this patent is extended or adjusted under 35 U.S.C. 154(b) by 49 days.

(21) Appl. No.: 09/847,095

(22) Filed: May 1, 2001

(65) Prior Publication Data

US 2002/0162332 A1 Nov. 7, 2002

(51) Int. Cl.[7] ................................................. F02C 3/20
(52) U.S. Cl. .......................... 60/39.12; 60/780; 210/761
(58) Field of Search ............................... 60/39.12, 775, 60/780, 781

(56) References Cited

U.S. PATENT DOCUMENTS

| | | | |
|---|---|---|---|
| 4,010,098 A | 3/1977 | Fassello | |
| 4,061,566 A | 12/1977 | Modell | |
| 4,100,730 A | 7/1978 | Pradt | |
| 4,292,953 A | 10/1981 | Dickinson | |
| 4,338,199 A | 7/1982 | Modell | |
| 4,377,066 A | * 3/1983 | Dickinson | 60/775 |
| 4,380,960 A | 4/1983 | Dickinson | |
| 4,543,190 A | 9/1985 | Modell | |
| 4,594,164 A | 6/1986 | Titmas | |
| 4,822,497 A | 4/1989 | Hong | |
| 4,898,107 A | * 2/1990 | Dickinson | 60/775 |
| 5,100,560 A | 3/1992 | Huang | |
| 5,200,093 A | 4/1993 | Barner | |
| 5,232,604 A | 8/1993 | Swallow | |
| 5,252,224 A | 10/1993 | Modell | |
| 5,339,621 A | * 8/1994 | Tolman | 60/39.12 |
| 5,437,798 A | 8/1995 | LaRoche | |
| 5,501,799 A | 3/1996 | Bond | |
| 5,527,471 A | 6/1996 | Hong | |
| 5,558,783 A | 9/1996 | McGuinness | |
| 5,674,405 A | 10/1997 | Bourhis | |
| 6,238,568 B1 | 5/2001 | Hazlebeck | |

* cited by examiner

Primary Examiner—Michael Koczo
(74) Attorney, Agent, or Firm—Nydegger & Associates

(57) ABSTRACT

A system for processing organic material to produce energy includes a reactor vessel for hydrothermally treating the organic material with water to produce an effluent. In the reactor vessel, the organic material is gasified to produce an effluent containing combustible gases, steam, particulates, salts and corrosive species. The effluent is passed to a heat exchanger for cooling to a temperature sufficient to condense any water vapor in the effluent. The cooled effluent is subsequently separated into a relatively clean gaseous portion and a residual portion containing the condensed water, particulates, salts, and other corrosive species. The gaseous portion is fed into the combustion chamber of a gas turbine, along with air, to produce energy. The heat extracted from the effluent and the waste heat from the gas turbine can be used to preheat the organic material before hydrothermal treatment or to drive a steam turbine.

46 Claims, 6 Drawing Sheets

HYDROTHERMAL CONVERSION AND SEPARATION

FIELD OF THE INVENTION

The present invention pertains generally to methods and systems for processing organics to produce energy. More specifically, the present invention pertains to methods and systems which gasify organics using hydrothermal treatment and subsequently use the resultant gases to produce energy. The present invention is particularly, but not exclusively, useful as a method and system for gasifying organics in a hydrothermal treatment reactor and subsequently extracting combustible gases from the reactor effluent in a clean form suitable for introduction into an energy producing gas turbine.

BACKGROUND OF THE INVENTION

The present invention relates generally to processes for the conversion of organics. This conversion can be performed to produce energy, to chemically convert the organics into a less hazardous form, or both. For example, a waste stream that is hazardous due to one or more organic constituents can be processed in accordance with the present invention to produce one or more non-hazardous waste streams. Alternatively, a raw material containing organics can be processed according to the present invention to produce heat which can subsequently be used to produce electricity.

Processes for the conversion of organics can generally be classified as either oxidation processes or reformation processes. In the former, the goal is generally to completely oxidize the organic by reacting it with an excess amount of oxidant. The oxidation reaction is generally exothermic allowing the process to be used to produce energy. In contrast, in reformation processes, the organic is reacted in the absence of an oxidant or with a sub-stoichiometric amount of oxidant to reform or gasify the organic into compounds that are not fully oxidized. One example of a reformation process is the conversion of the large hydrocarbon molecules found in oil deposits into smaller molecules suitable for use in combustion engines. This process is often referred to as gasification because the small molecules produced are generally gaseous under standard atmospheric conditions.

Both oxidation and reformation processes can be performed in aqueous media under supercritical conditions to obtain extremely high reaction rates. For example, U.S. Pat. No. 4,338,199, which issued to Modell on Jul. 6, 1982 discloses an oxidation process in aqueous media, which has come to be known as supercritical water oxidation ("SCWO"). As the name SCWO implies, in some implementations of the SCWO process, oxidation occurs essentially entirely at conditions which are supercritical in both temperature (>374° C.) and pressure (>about 3,200 psi or 218 bar). In fact, SCWO has been shown to give rapid and complete oxidation of virtually any organic compound in a matter of seconds at five hundred degrees Celsius to six hundred fifty degrees Celsius (500° C.–650° C.) and 250 bar. Importantly for the present invention, rapid reaction rates have also been observed for reforming processes such as the gasification of organics under supercritical conditions.

For some feedstocks, rapid reaction rates in either oxidizing or non-oxidizing environments can be achieved at subcritical pressures. For example, U.S. Pat. No. 5,106,513, issued Apr. 21, 1992 to Hong, discloses a conversion process in aqueous media wherein temperatures in the range of six hundred degrees Celsius (600° C.) and pressures between 25 bar to 220 bar are used. For purposes of the present disclosure, the various processes describe above for oxidation and reformation in aqueous media are referred to collectively as hydrothermal treatment, if carried out at temperatures between approximately three hundred seventy-four degrees Celsius to eight hundred degrees Celsius (374° C.–800° C.), and pressures between approximately 25 bar to 1,000 bar.

At typical hydrothermal treatment conditions, densities are in the range of 0.1 g/cc. At these densities, water molecules are considerably farther apart than they are for liquid water under standard conditions. Hydrogen bonding, a short-range phenomenon, is almost entirely disrupted, and the water molecules lose the ordering responsible for many of liquid water's characteristic properties. In particular, solubility behavior is closer to that of high pressure steam than to liquid water. Smaller polar and nonpolar organic compounds, with relatively high volatility, will exist as vapors at typical SCWO conditions, and hence will be completely miscible with supercritical water. Gases such as $N_2$, $O_2$, and $CO_2$ show similar complete miscibility. Larger organic compounds and polymers will hydrolyze to smaller molecules at typical SCWO conditions, thus resulting in solubilization via chemical reaction. The loss of bulk polarity by the water phase has striking effects on normally water-soluble salts, as well. In particular, because they are no longer readily solvated by water molecules, salts frequently precipitate out as solids which can deposit on process surfaces and cause fouling of heat transfer surfaces or blockage of the process flow.

Theoretically, oxidation under hydrothermal treatment conditions could be used to produce energy. As indicated above, most oxidation reactions are exothermal, and as such can be conducted to produce heat, which can subsequently be used to produce more useful forms of energy such as electricity. Unfortunately, a large amount of energy is expended pressurizing the oxidant prior to introducing the oxidant into the reactor vessel. Thus, only a small amount of net energy is produced, especially when waste streams or other feedstocks having a low thermal value are oxidized.

Unlike oxidation under hydrothermal treatment conditions, gasification does not require the pressurization of an oxidant. Thus, hydrothermal treatment conditions can be used to efficiently gasify an organic and the resultant gases used to produce energy. Unfortunately, for most feedstocks, the effluent exiting the gasification reactor contains particulates, salts and other corrosive species that renders the effluent unsuitable for direct introduction into energy producing devices such as turbines or gas turbines. Further, filtration of solids from the high pressure, high temperature effluent is often impractical, and soluble salts and corrosive species cannot be removed by standard filtration.

In light of the above, it is an object of the present invention to provide a system and method for efficiently processing organics to produce energy. Another object of the present invention is to provide a system and method for processing organics to produce energy that does not expend the large amount of energy necessary to pressurize an oxidant to a pressure suitable for introducing the oxidant into a hydrothermal reactor vessel. It is yet another object of the present invention to provide a system and method for processing organics to produce energy which allows for the efficient processing of organic feedstocks that may contain particulates, salts or other corrosives species. Still another object of the present invention is to provide a system and method for obtaining clean, combustible gases suitable for direct introduction into an energy producing gas turbine from an organic feedstock that may contain particulates, salts or other corrosives species. Another object of the present invention is to provide systems and methods for processing feedstocks to efficiently convert hazardous organic constituents into non-hazardous constituents. Still another object of the present invention is to provide systems and methods for processing feedstocks to produce a clean gas effluent at moderate to high pressures to aid in subsequent gas separation. Yet another object of the present invention is to provide systems and methods for processing feedstocks containing organics to produce energy which are easy to implement, simple to use, and comparatively cost effective.

SUMMARY OF THE PREFERRED EMBODIMENTS

In accordance with the present invention, a system for processing organic material to produce energy includes a reactor vessel for hydrothermally treating the organic material with water to produce an effluent. Specifically, the organic material is hydrothermally treated in water to gasify the organic material and produce combustible gases in the reactor effluent that can be subsequently used to produce energy. As detailed further below, heat that is generated by the system can be used to preheat the organic material and/or feed water prior to hydrothermal treatment.

A pump is provided to feed the organic material and water into the reactor vessel. In the reactor vessel, the organic material and water are maintained at a temperature between approximately 374° C. and approximately 800° C. and a pressure above approximately 25 bar. The mixture is maintained at these conditions for a predetermined residence time to gasify at least a portion of the organic material. Exemplary residence times can vary between approximately a few seconds to approximately several minutes. Although the composition of the reaction products that are produced in the reactor vessel depends upon the organic material that is gasified, it is to be appreciated that the effluent exiting the reactor vessel will generally be composed of a hot, gaseous mixture of steam and combustible gases. Further, the gaseous mixture of steam and combustible gases will generally contain particulates, salts and corrosive species, rendering the effluent unsuitable for direct introduction into a turbine or gas turbine.

After hydrothermal treatment, heat can be extracted from the resulting effluent to preheat the feed material. Additionally, combustible gases in the effluent can be extracted for energy production. In detail, the effluent is cooled to a temperature that is sufficient to condense water vapor in the effluent. Preferably, for this purpose, a heat exchanger is used to cool the effluent. The heat extracted from the effluent can then be used to preheat the feed directly (i.e. by passing the feed through the heat exchanger). Alternatively, an exchange fluid can be used to transfer the heat from the effluent to the feed. Specifically, the exchange fluid can receive heat from the effluent in one heat exchanger and then pass the heat to the feed material in another heat exchanger. Importantly, the effluent is cooled sufficiently to condense water vapors that are present in the effluent. It is to be appreciated that the condensed water vapor will scrub any particulates, salts and corrosive species from the remaining gases in the effluent. Typically, cooling the effluent to a temperature below approximately 374° C. will be sufficient to condense water vapor. The result is a cooled effluent having a relatively clean gaseous portion and a residual portion containing liquid water, particulates, salts, and other corrosive species.

From the heat exchanger, the cooled effluent is piped to a gas-liquid separator which separates the cooled effluent into a relatively clean gaseous stream and a residual stream. From the separator, the residual stream can be depressurized for further processing or disposal. On the other hand, the clean gaseous stream is expanded using a partial pressure reduction valve and then separated into fractions using a gas separator. For the present invention, at least one fraction of gas from the gas separator is fed into the combustion chamber of a gas turbine, along with air, to produce energy.

In accordance with the present invention, waste heat generated by the gas turbine is used to preheat the feed material before the feed material is introduced into the reactor vessel for hydrothermal treatment. Any remaining waste heat from the gas turbine can be used to produce steam for introduction into a steam turbine to generate energy.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
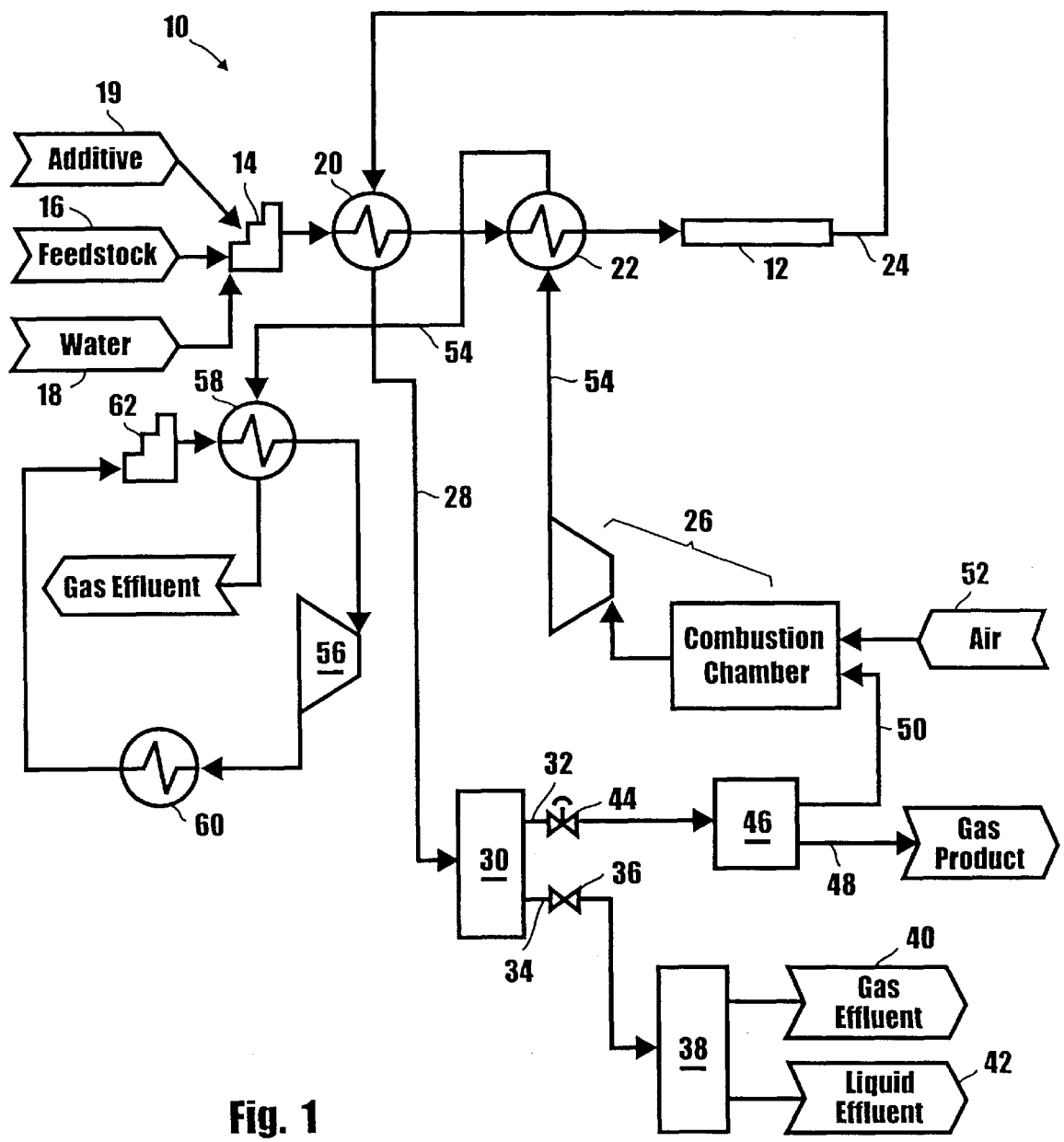
FIG. 1 is a schematic diagram of the components of a system in accordance with the present invention.

Referring initially to FIG. 1, a system for processing organics in accordance with the present invention is schematically shown and generally designated 10. As shown, the system 10 includes a reactor vessel 12 capable of gasifying a mixture of water and organics at hydrothermal treatment conditions. For the present invention, the reactor vessel 12 can include mechanical systems such as scrapers, liners, and/or purging systems to assist in salt transport through the reactor vessel 12. As shown, a high pressure pump 14 can be used to pump a feedstock 16 containing an organic and water 18 into the reactor vessel 12. It is to be appreciated that the feedstock 16 may contain sufficient water 18 or a supplementary source of water 18 may be used. For the present invention, the feedstock 16 can include one or more waste materials such as sewage, biologically digested sewage, municipal solid waste, biological sludge or a hazardous waste. Alternately, the feedstock 16 can include one or more raw materials such as an oil-based hydrocarbon, alone, or mixed with one or more waste materials. It is to be appreciated that the feedstock 16 can be processed in accordance with the present invention for the purpose of producing energy, to convert the hazardous organic chemicals in the feedstock 16 into non-hazardous chemicals, or both.

As contemplated for the present invention, additives 19 can be pumped into the reactor 12 by the pump 14. Additives 19 can consist of neutralizing agents such as NaOH, KOH, $Ca(OH)_2$, $H_2SO_4$, $H_3PO_4$, and HCl to neutralize acids formed in the reactor 12 and/or reduce $H_2S$ in the gas phase. Additives 19 can also include $H_3PO_4$, $NaH_2PO_4$, $Na_2HPO_4$ and $Na_3PO_4$ or inert solids such as, sand, silica, soil, titanium dioxide, clay, metal, or ceramic to aid in salt transport. Additives 19 can also include salt-forming agents, corrosion inhibitors, minerals, and/or combustible material for use as an auxiliary fuel, such as ethanol. Also, catalyzing materials such as zeolites, heavy metal oxides or noble metals may be used to promote or accelerate the gasification reaction. Alternatively, an additive 19 that participates in the reaction such as a $CO_2$ getter can be used. Suitable $CO_2$ getters include NaOH, KOH and $Ca(OH)_2$.

In the embodiment of the present invention shown in FIG. 1, heat exchangers 20 and 22 can be used to preheat the feedstock 16 and water 18 prior to introduction into the reactor vessel 12. As further detailed below, heat generated in the system 10 can be supplied to preheat the feedstock 16 and water 18 via heat exchangers 20, 22. Consequently, as shown in FIG. 1, the feedstock 16 and water 18 are pumped through heat exchangers 20, 22 and into reactor vessel 12 by one or more high pressure pumps 14.

In the reactor vessel 12, the mixture of feedstock 16 and water 18 is processed at a temperature between approximately 374° C. and approximately 800° C. and a pressure above approximately 25 bar. The mixture is maintained at these conditions for a predetermined residence time to gasify at least a portion of the organic material in the feedstock 16. Exemplary residence times can vary between approximately a few seconds to approximately several minutes. It is to be appreciated that the composition of the reaction products that are produced in the reactor vessel 12 will depend on the makeup of the feedstock 16. Nevertheless, as contemplated for the present invention, the effluent 24 exiting the reactor vessel 12 will generally be composed of a hot, gaseous mixture of steam and combustible gases containing particulates, salts and corrosive species such as acids.

Referring still to FIG. 1, it can be seen that the effluent 24 exits the reactor vessel 12 after hydrothermal treatment (gasification) for further processing. More specifically, heat is extracted from the effluent 24 to preheat the feedstock 16 and water 18. In addition, the effluent 24 is processed to produce energy in a gas turbine 26. In detail, as shown, the effluent 24 from the reactor vessel 12 is passed through heat exchanger 20 to pass heat from the effluent 24 to the feedstock 16 and water 18. The exchange of heat at heat exchanger 20 is controlled to cool the effluent 24 to a temperature that is sufficient to condense water vapor in the effluent 24. Typically, cooling the effluent 24 to a temperature below approximately 374° C. will be sufficient to condense water vapor. The heat exchange at heat exchanger 20 is also used to preheat the feedstock 16 and water 18. For the present invention, the water vapor in the effluent 24 is condensed to scrub any particulates, salts and corrosive species from the remaining gases in the effluent 24. The result is a cooled effluent 28, exiting the heat exchanger 20, having a relatively clean gaseous portion and a residual portion containing liquid water, particulates, salts, and other corrosive species. Further, some $CO_2$ gas will be entrained in the residual portion, leading to a higher quality gaseous portion.

From heat exchanger 20, the cooled effluent 28 is piped to a gas-liquid separator 30 for separation of the cooled effluent 28 into a relatively clean gaseous stream 32 and a residual stream 34. From the separator 30, the residual stream 34 can be sent to a pressure reduction valve 36. From the valve 36, the depressurized residual stream 34 can be separated in a gas-liquid separator 38, if desired. For example, carbon dioxide can be separated from the remaining solids and liquids. The resultant gas effluent 40 and liquid effluent 42 can be further processed, if desired, or disposed of using conventional methods. Also, solids can be removed from the residual stream 34 and any organic material present can be introduced in the combustion chamber of the gas turbines 26.

From the gas-liquid separator 30, the clean gaseous stream 32 is expanded using a partial pressure reduction valve 44 and the expanded gaseous stream 32 is piped into a gas separator 46 for separation into gas fractions, such as the fractions 48, 50 shown in FIG. 1. For the present invention, gas separator 46 can be a membrane type filter or any other type of separator known in the art to separate gases. Importantly, the pressure in the expanded gaseous stream 32 can be used as the driving force in the gas separation process. Although only two gas fractions 48, 50 are shown in FIG. 1, it is to be appreciated that the gaseous stream 32 may be separated into three or more fractions by the gas separator 46, if desired. Further, it is to be appreciated that for some applications, the gaseous stream 32 may be fed directly into the combustion chamber of the gas turbine 26 without separation into fractions.

As shown in FIG. 1, an optional gas fraction 48 can be removed from the process for use as a product gas. It is to be appreciated that the system 10 can be configured to produce a product that is a liquid under standard temperature and pressure. For the present invention, the gas fraction 48 may be removed because it is unsuitable for use in a gas turbine 26 or because it is desirable to use the gas fraction 48 in another application. For example, the gas fraction 48 may include hydrogen or methane gas for accumulation and subsequent use in another application. On the other hand, as shown in FIG. 1, gas fraction 50 is fed into the combustion chamber of a gas turbine 26 for mixture with air 52. Auxiliary fuel can be added to the combustion chamber to drive the gas turbine 26, if desired. For the present invention, the gas turbine 26 can be configured to drive a generator (not shown) to produce electricity. Exhaust 54 from the gas turbine 26 can be piped to heat exchanger 22 to preheat the feedstock 16 and water 18, as shown. Alternatively, waste heat from the gas turbine 26 can be used to regenerate the additives 19 (regeneration not shown). For example, $CaCO_3$ can be converted back to $Ca(OH)_2$ by calcining.

After passing through the heat exchanger 22, any excess heat in the exhaust 54 can be used to drive a steam turbine 56. In detail, exhaust 54 is piped from heat exchanger 22 to heat exchanger 58, as shown. Heat exchanger 58, in turn, passes the heat to water flowing in a closed loop fluid circuit that includes the steam turbine 56, a condenser 60 and a pump 62. In the fluid circuit, water is pumped by the pump 62 through the heat exchanger 58 where it is heated (by the excess heat in the exhaust 54) and converted to steam. From the heat exchanger 58, the steam is piped to the steam turbine 56. For the present invention, the steam turbine 56 can be configured to drive a generator (not shown) to produce electricity. From the steam turbine 56, the spent steam can be condensed in the condenser 60 and piped back to the pump 62 for recirculation within the fluid circuit.

Figure 2:
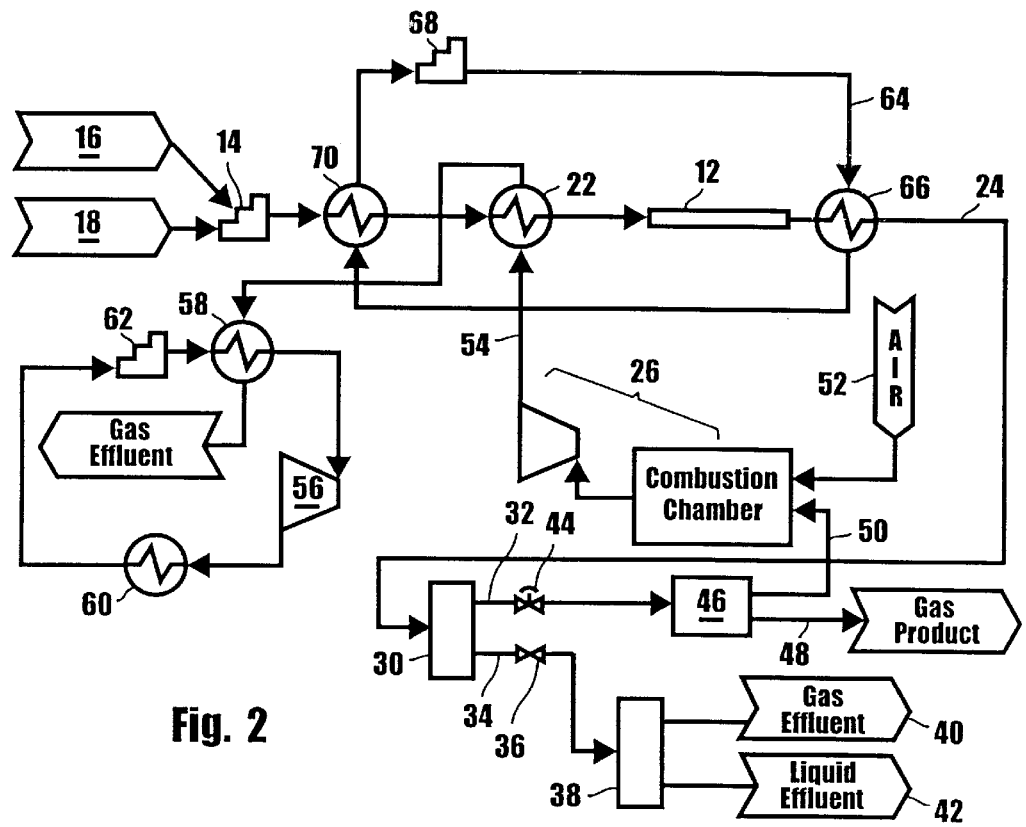
FIG. 2 is a schematic diagram of another embodiment for the present invention in which an exchange fluid is used to transfer heat from the reactor effluent to the feed material.

Referring now to FIG. 2, another embodiment for the present invention is shown that utilizes a heat exchange fluid 64 to pass heat from the effluent 24 to the feedstock 16 and water 18. As shown, in this embodiment, effluent 24 from the reactor vessel 12 is passed through a heat exchanger 66 to cool the effluent 24. As further shown in FIG. 2, heat exchanger 66 is part of a closed loop fluid circuit having a pump 68 and another heat exchanger 70. Heat exchange fluid 64 in the circuit is pumped through heat exchanger 66 by pump 68. At heat exchanger 66, the heat exchange fluid 64 receives heat from the effluent 24. From the heat exchanger 66, the heat exchange fluid 64 passes through heat exchanger 70, where it is forwarded back to the pump 68 for recirculation. At heat exchanger 70, the heat exchange fluid 64 releases some or all of the heat from the effluent 24 to preheat the feedstock 16 and water 18. From the heat exchanger 70, the feedstock 16 and water 18 are pumped by pump 14 through heat exchanger 22 (to receive heat from the gas turbine exhaust 54) and then into the reactor vessel 12.

Figure 3:
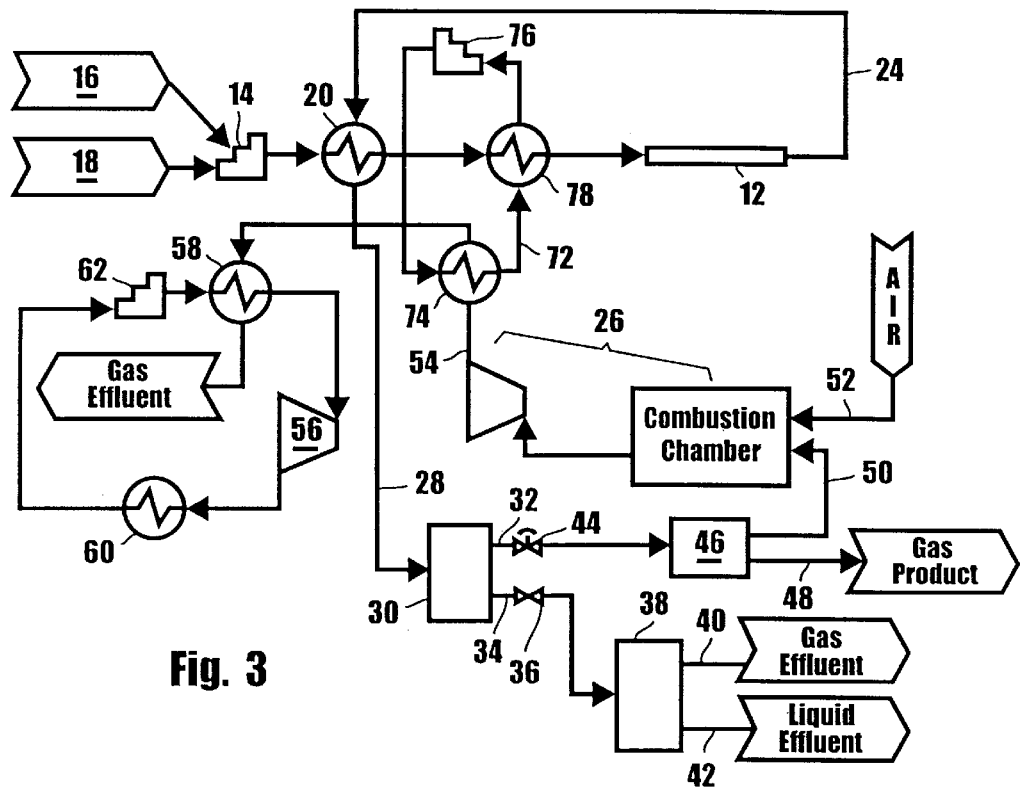
FIG. 3 is a schematic diagram of another embodiment for the present invention in which an exchange fluid is used to transfer heat from the gas turbine to the feed material.

Referring now to FIG. 3, another embodiment for the present invention is shown, similar to the embodiment shown in FIG. 1. In the embodiment shown in FIG. 3, a heat exchange fluid 72 is used to pass heat from the gas turbine exhaust 54 to the feedstock 16 and water 18. As shown in this embodiment, exhaust 54 from the gas turbine 26 is passed through a heat exchanger 74 to heat the heat exchange fluid 72. As further shown in FIG. 3, heat exchanger 74 is part of a closed loop fluid circuit having a pump 76 and another heat exchanger 78. Heat exchange fluid 72 in the circuit is pumped through heat exchangers 74, 78 by pump 76. At heat exchanger 74, the heat exchange fluid 72 receives heat from the gas turbine exhaust 54. From the heat exchanger 74, the heat exchange fluid 72 is forwarded to heat exchanger 78. At heat exchanger 78, the heat exchange fluid 72 releases some or all of the heat from the gas turbine exhaust 54 to preheat the feedstock 16 and water 18. From heat exchanger 78, the heat exchange fluid 72 is forwarded back to the pump 76 for recirculation. From the heat exchanger 78, the feedstock 16 and water 18 are pumped by pump 14 into the reactor vessel 12.

Figure 4:
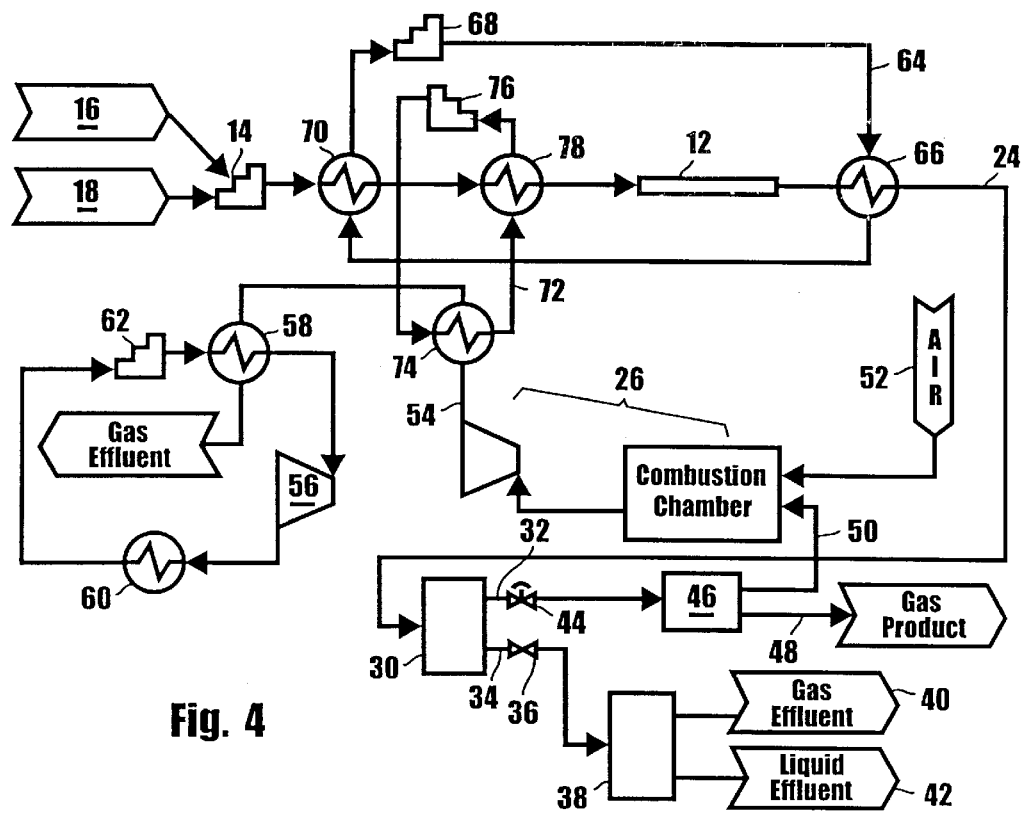
FIG. 4 is a schematic diagram of another embodiment for the present invention in which a first exchange fluid is used to transfer heat from the reactor effluent to the feed material and a second exchange fluid is used to transfer heat from the gas turbine to the feed material.

Referring now to FIG. 4, another embodiment for the present invention is shown, similar to the embodiments shown in FIGS. 2 and 3. In the embodiment shown in FIG. 4, a heat exchange fluid 64 is used to pass heat from the effluent 24 to the feedstock 16 and water 18 and a heat exchange fluid 72 is used to pass heat from the gas turbine exhaust 54 to the feedstock 16 and water 18. As shown in this embodiment, effluent 24 from the reactor vessel 12 is passed through a heat exchanger 66 to cool the effluent 24. As further shown in FIG. 4, heat exchanger 66 is part of a closed loop fluid circuit having a pump 68 and another heat exchanger 70. Heat exchange fluid 64 in the circuit is pumped through heat exchanger 66 by pump 68. At heat exchanger 66, the heat exchange fluid 64 receives heat from the effluent 24. From the heat exchanger 66, the heat exchange fluid 64 passes through heat exchanger 70, where it is forwarded back to the pump 68 for recirculation. At heat exchanger 70, the heat exchange fluid 64 releases some or all of the heat from the effluent 24 to preheat the feedstock 16 and water 18.

Also shown in the embodiment shown in FIG. 4, exhaust 54 from the gas turbine 26 is passed through a heat exchanger 74 to heat the heat exchange fluid 72. As further shown in FIG. 4, heat exchanger 74 is part of a closed loop fluid circuit having a pump 76 and another heat exchanger 78. Heat exchange fluid 72 in the circuit is pumped through heat exchangers 74, 78 by pump 76. At heat exchanger 74, the heat exchange fluid 72 receives heat from the gas turbine exhaust 54. From the heat exchanger 74, the heat exchange fluid 72 is forwarded to heat exchanger 78. At heat exchanger 78, the heat exchange fluid 72 releases some or all of the heat from the gas turbine exhaust 54 to preheat the feedstock 16 and water 18. From heat exchanger 78 the heat exchange fluid 72 is forwarded back to the pump 76 for recirculation. As shown, feedstock 16 and water 18 are first pumped by pump 14 through heat exchanger 70, then through heat exchanger 78, and then into the reactor vessel 12.

Figure 5:
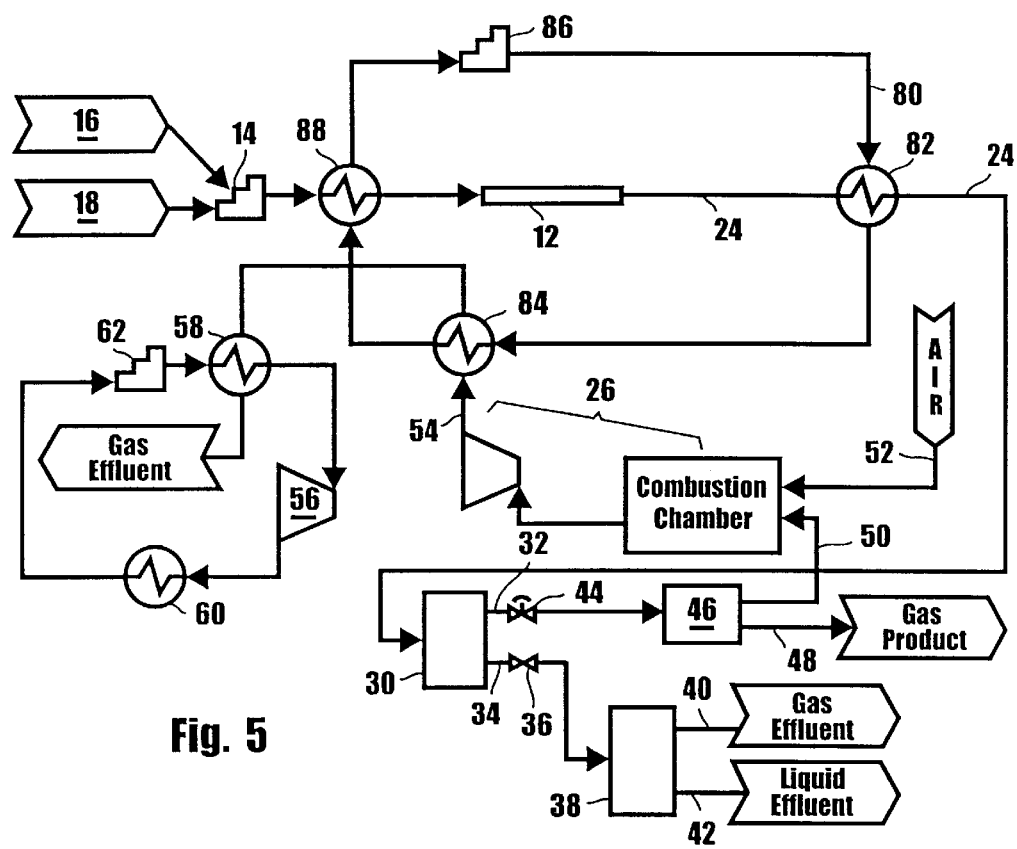
FIG. 5 is a schematic diagram of another embodiment for the present invention in which one exchange fluid is used to transfer heat from the reactor effluent to the feed material and transfer heat from the gas turbine to the feed material.

Referring now to FIG. 5, another embodiment for the present invention is shown, similar to the embodiment shown in FIG. 4. In the embodiment shown in FIG. 5, a single heat exchange fluid 80 is used to pass heat from the effluent 24 and heat from the gas turbine exhaust 54 to the feedstock 16 and water 18. As shown in this embodiment, effluent 24 is passed through a heat exchanger 82 to heat the heat exchange fluid 80. Also, exhaust 54 from the gas turbine 26 is passed through a heat exchanger 84 to heat the heat exchange fluid 80. As further shown in FIG. 3, heat exchangers 82 and 84 are part of a closed loop fluid circuit having a pump 86 and another heat exchanger 88. Heat exchange fluid 80 in the circuit is pumped through heat exchangers 82, 84 and 88 by pump 86. At heat exchanger 82, the heat exchange fluid 80 receives heat from the effluent 24. From the heat exchanger 82, the heat exchange fluid 80 is piped to heat exchanger 84 where it receives heat from the gas turbine exhaust 54. From the heat exchanger 84, the heat exchange fluid 80 is piped to heat exchanger 88. At heat exchanger 88, the heat exchange fluid 80 releases some or all of the heat from the gas turbine exhaust 54 to preheat the feedstock 16 and water 18. From the heat exchanger 88, the heat exchange fluid 80 is forwarded back to the pump 86 for recirculation. As shown, the feedstock 16 and water 18 are pumped by pump 14 through the heat exchanger 78 and into the reactor vessel 12.

Figure 6:
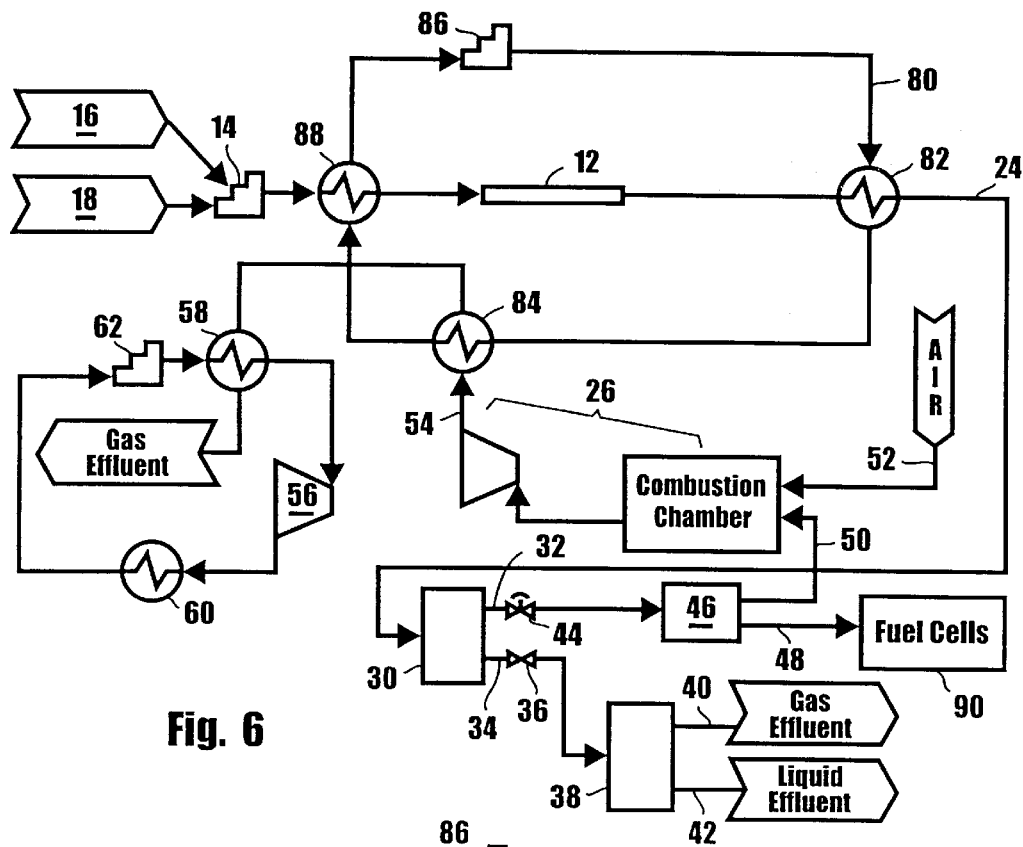
FIG. 6 is a schematic diagram of another embodiment for the present invention in which power is generated by a gas turbine, a steam turbine, and one or more fuel cells.

Referring now to FIG. 6, another embodiment for the present invention is shown, similar to the embodiment shown in FIG. 5. In the embodiment shown in FIG. 6, the fraction 48 of gas from the gas separator 46 is forwarded to one or more fuel cells 90. For example, fraction 48 can consist of hydrogen gas for use in a hydrogen/oxygen fuel cell to produce electricity. For the present invention, the fuel cell(s) 90 can be any type of fuel cell known in the pertinent art.

Figure 7:
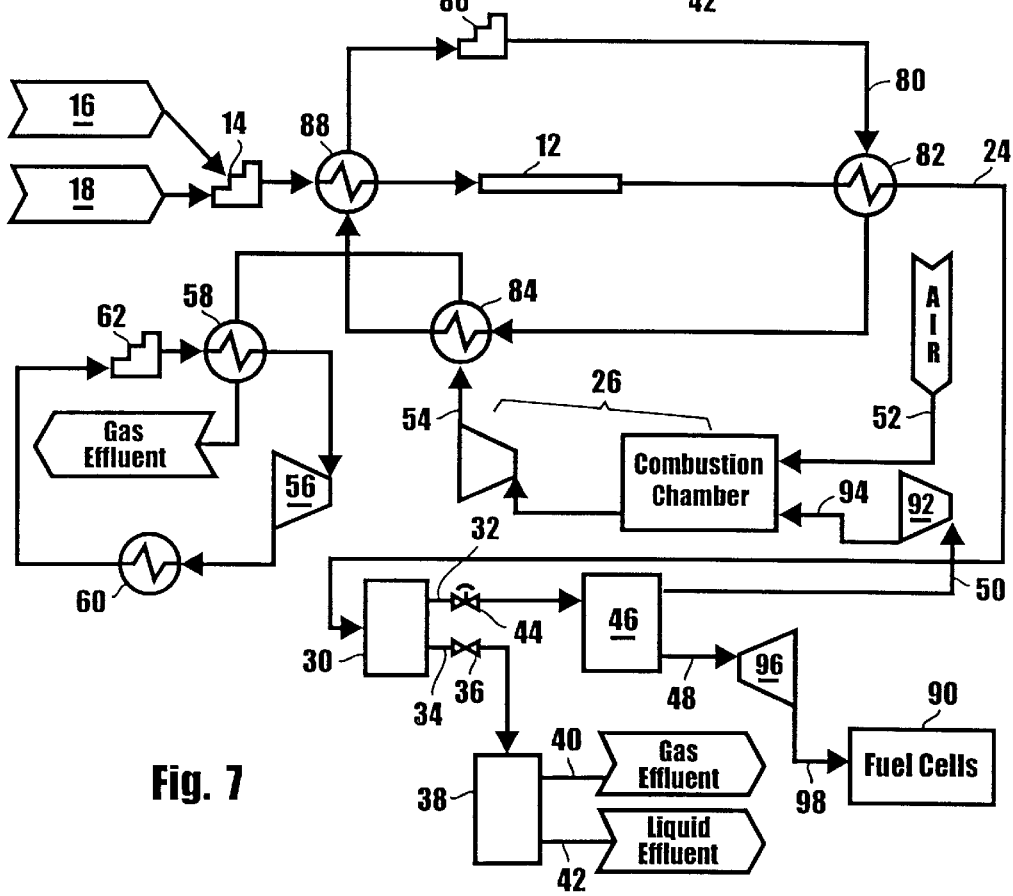
FIG. 7 is a schematic diagram of another embodiment for the present invention in which power is generated by a gas turbine, a steam turbine, one or more fuel cells and one or more gas pressure let-down devices.

Referring now to FIG. 7, another embodiment for the present invention is shown, similar to the embodiment shown in FIG. 6. In the embodiment shown in FIG. 7, the fraction 50 of gas from the gas separator 46 is used to produce energy in a gas pressure let-down device 92. For the present invention any type of gas pressure let-down device known in the pertinent art for producing energy from a pressurized gas can be used. As shown, from the gas pressure let-down device 92, the reduced pressure gas 94 is directed into the combustion chamber of the gas turbine 26. Similarly, a gas pressure let-down device 96 can be used to produce energy from the fraction 48, as shown. From the gas pressure let-down device 96, the reduced pressure gas 98 is directed to fuel cell(s) 90.

Figure 8:
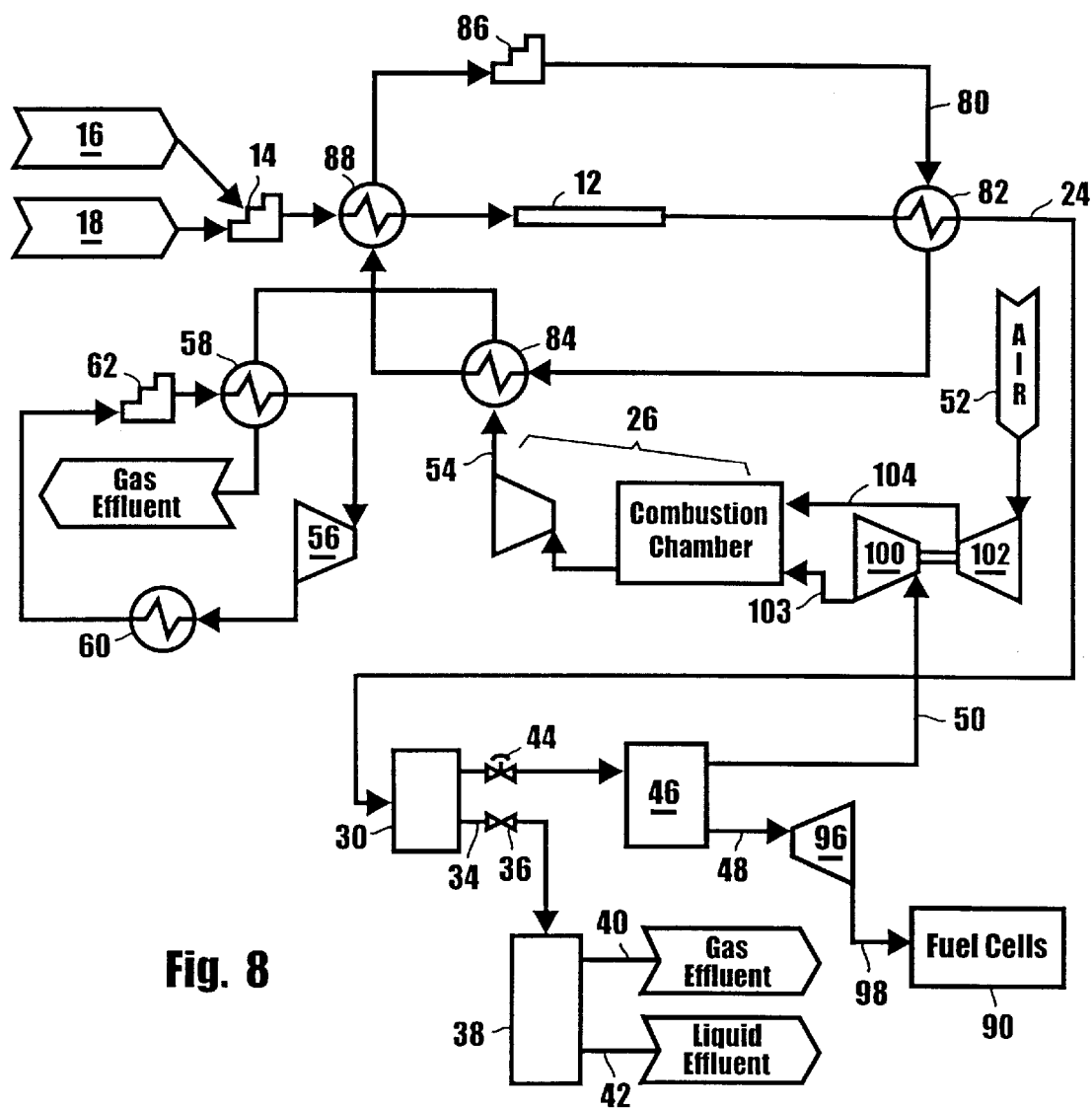
FIG. 8 is a schematic diagram of another embodiment for the present invention in which a gas pressure let-down device is mechanically coupled to an air compressor to pressurize air for introduction into the gas turbine.

Referring now to FIG. 8, another embodiment for the present invention is shown, similar to the embodiment shown in FIG. 7. In the embodiment shown in FIG. 8, the fraction 50 of gas from the gas separator 46 is directed to a gas pressure let-down device 100 that is mechanically coupled to an air compressor 102. As shown, from the gas pressure let-down device 100, the reduced pressure gas 103 is directed into the combustion chamber of the gas turbine 26. It is to be appreciated that the mechanical output from the let-down device 100 can be used to drive the air compressor 102 for the purpose of pressurizing the air 52. For the present invention, any type of gas pressure let-down device, mechanical coupling and air compressor known in the pertinent art for obtaining mechanical energy from a pressurized gas and using the mechanical energy to pressurize air can be used. From the air compressor 102 the pressurized air 104 is fed into the combustion chamber of the gas turbine 26 for combustion with the reduced pressure gas 103. Alternatively, an eductor (not shown) driven by the pressure of the fraction 50 can be used to pressurize the air 52 before introduction into the gas turbine 26.

Figure 9:
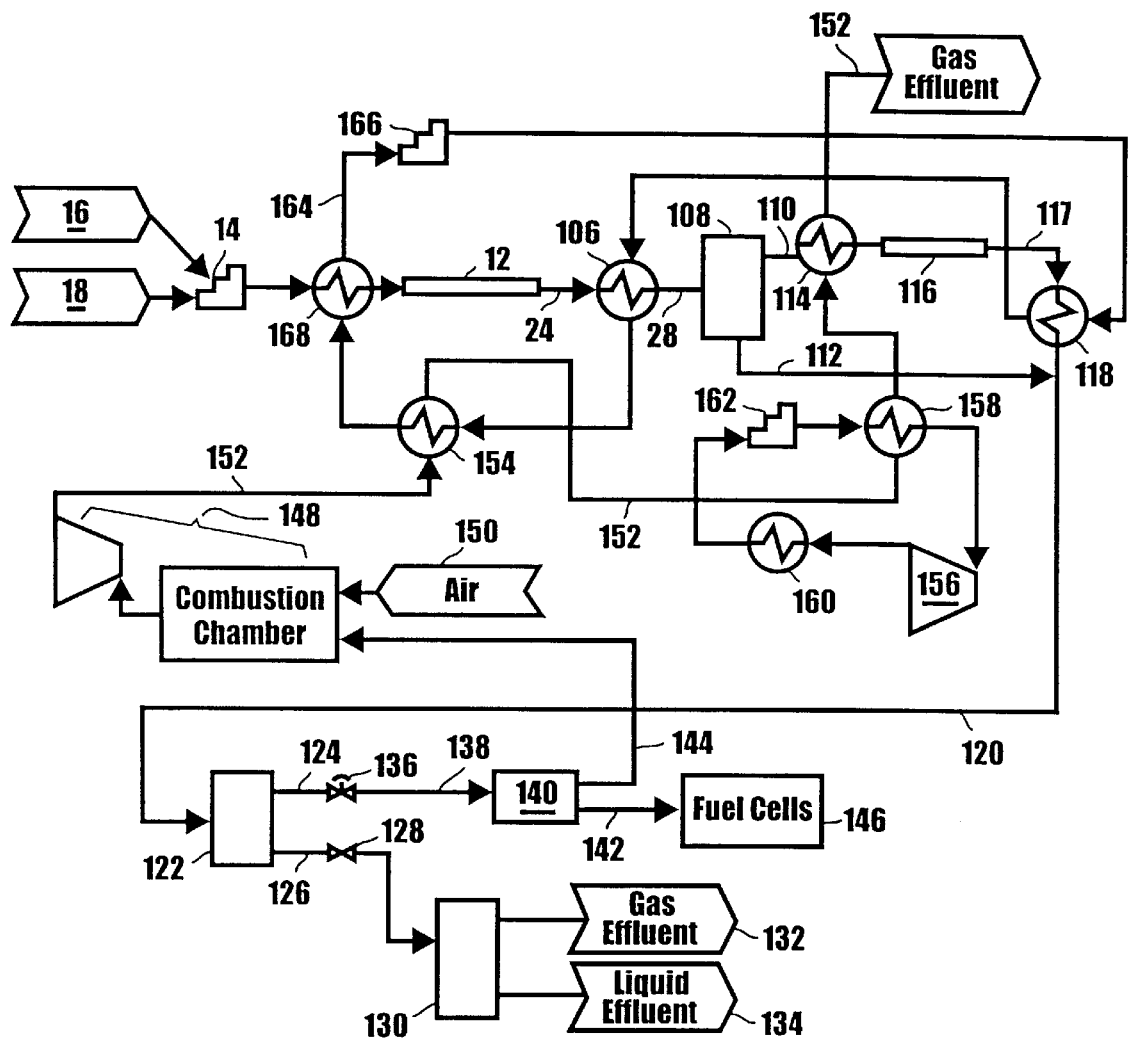
FIG. 9 is a schematic diagram of another embodiment for the present invention in which a catalytic converter is provided to convert a portion of the reactor effluent.

Referring now to FIG. 9, another embodiment for the present invention is shown, similar to the embodiment shown in FIG. 1. In the embodiment shown in FIG. 9, the effluent 24 from the reactor vessel 12 is first cooled in a heat exchanger 106. The exchange of heat at heat exchanger 106 is controlled to cool the effluent 24 to a temperature that is sufficient to condense water vapor in the effluent 24. For the present invention, the water vapor in the effluent 24 is condensed to scrub any particulates, salts and corrosive species from the remaining gases in the effluent 24. The result is a cooled effluent 28 exiting the heat exchanger 106, having a relatively clean gaseous portion and a residual portion containing liquid water, particulates, salts, and other corrosive species. From the heat exchanger 106, the cooled effluent is piped to a gas-liquid separator 108 for separation into a relatively clean gaseous portion 110 and a residual portion 112 containing liquid water, particulates, salts, and other corrosive species. As shown, the gaseous portion 110 is heated by heat exchanger 114 and fed into a catalytic converter 116. For the present invention, the catalytic converter 116 can be used to favorably alter the gas chemistry in the gaseous portion 110. For example, the catalytic converter can be used to increase the concentration of hydrogen gas ($H_2$) in the gaseous portion 110. Importantly, the gaseous portion 110 input into the catalytic converter 116 has been scrubbed of any liquids, particulates, salts, and other corrosive species that may plug the catalytic converter 116 or may poison the catalysts in the catalytic converter 116. This scrubbing is accomplished by the liquid created during cooling by the heat exchanger 106.

Referring still to FIG. 9, it can be seen that from the catalytic converter 116, the converted stream 117 can be passed through a heat exchanger 118 to extract excess heat. From the heat exchanger 118, the converted stream 117 can be recombined with the residual portion 112 to create a combined stream 120. As shown, the combined stream 120 is piped to another gas-liquid separator 122 for separation into a relatively clean gaseous stream 124 and a residual stream 126. From the separator 122, the residual stream 126 can be sent to a pressure reduction valve 128. From the valve 128, the depressurized residual stream 126 can be separated in another gas-liquid separator 130, if desired. The resultant gas effluent 132 and liquid effluent 134 can be further processed, if desired, or disposed of using conventional methods.

From the gas-liquid separator 122, the clean gaseous stream 124 is expanded using a partial pressure reduction valve 136 and the expanded gaseous stream 138 is piped into a gas separator 140 for separation into gas fractions, such as the fractions 142, 144, shown in FIG. 9. For the present invention, gas separator 140 can be a membrane type filter or any other type of separator known in the art to separate gases.

As further shown in FIG. 9, gas fraction 142 can be sent to one or more fuel cells 146. On the other hand, gas fraction 144 is fed into the combustion chamber of a gas turbine 148 for mixture with air 150. For the present invention, the gas turbine 148 can be configured to drive a generator (not shown) to produce electricity. Exhaust 152 from the gas turbine 148 can be piped to heat exchanger 154 to preheat the feedstock 16 and water 18, as shown.

After passing through the heat exchanger 154, any excess heat in the exhaust 152 can be used to drive a steam turbine 156. In detail, exhaust 152 is piped from heat exchanger 154 and through heat exchanger 158, as shown. Heat exchanger 158, in turn, passes the heat to water flowing in a closed loop fluid circuit that includes the steam turbine 156, a condenser 160 and a pump 162. In the fluid circuit, water is pumped by the pump 162 through the heat exchanger 158 where it is heated (by the excess heat in the exhaust 152) and converted to steam. From the heat exchanger 158, the steam is piped to the steam turbine 156. For the present invention, the steam turbine 156 can be configured to drive a generator (not shown) to produce electricity. From the steam turbine 156, the spent steam can be condensed in the condenser 160 and piped back to the pump 162 for recirculation within the fluid circuit.

Referring still to FIG. 9, the exhaust 152 can be piped from the heat exchanger 158 to the heat exchanger 114 to heat gaseous portion 110 to an appropriate temperature for catalytic conversion in catalytic converter 116. It is to be appreciated that the gaseous portion 110 may exit the gas-liquid separator 108 at a suitable temperature for catalytic conversion, obviating the need for the heat exchanger 114. From heat exchanger 114, the exhaust 152 can be vented to atmosphere or further processed, as desired. In the embodiment shown in FIG. 9, a heat exchange fluid 164 is used to pass heat extracted during the process to the feedstock 16 and water 18. As shown, a closed loop fluid circuit having a pump 166 and heat exchangers 118, 106, 154 and 168 is provided to pass process heat to the feedstock 16 and water 18. During operation, heat exchange fluid 164 in the circuit is pumped through heat exchanger 118 by pump 68. At heat exchanger 118, the heat exchange fluid 164 receives heat from the converted stream 117. From the heat exchanger 118, the heat exchange fluid 164 is piped through heat exchanger 106. At heat exchanger 106, the heat exchange fluid 164 receives heat from the effluent 24. From the heat exchanger 106, the heat exchange fluid 164 is piped through heat exchanger 154. At heat exchanger 154, the heat exchange fluid 164 receives heat from the gas turbine exhaust 152. From the heat exchanger 154, the heat exchange fluid 164 passes through heat exchanger 168, where it is forwarded back to the pump 166 for recirculation. At heat exchanger 168, the heat exchange fluid 164 releases some or all of the heat acquired from passage through heat exchangers 118, 106, 154 to preheat the feedstock 16 and water 18.

While the particular method and system as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

What is claimed is:

1. A method for processing an organic material to produce energy, said method comprising the steps of:
   hydrothermally treating the organic material with water to produce an effluent containing gases;
   cooling said effluent to a temperature sufficient to condense water vapor in said effluent to create a condensate;
   extracting gas from said cooled effluent;
   introducing said extracted gas into a gas turbine to produce energy and waste heat; and
   using said waste heat from said gas turbine to preheat the organic material prior to said hydrothermally treating step.

2. A method as recited in claim 1 wherein said hydrothermally treating step is accomplished at a temperature between approximately 374° C. and approximately 800° C. and a pressure above approximately 25 bar.

3. A method as recited in claim 1 wherein a heat exchanger is used to cool said effluent and the heat obtained by said heat exchanger is used to preheat the organic material.

4. A method as recited in claim 3 wherein an exchange fluid is used to transport heat from said heat exchanger to the organic material to preheat the organic material.

5. A method as recited in claim 1 wherein said effluent is cooled to a temperature below approximately 374° C. during said cooling step.

6. A method as recited in claim 1 wherein an exchange fluid is used to transport heat from said gas turbine to the organic material to preheat the organic material.

7. A method as recited in claim 1 further comprising the steps of:
   using waste heat from said gas turbine to produce steam; and
   passing said steam through a steam turbine to produce energy.

8. A method as recited in claim 1 further comprising the steps of:
   reducing the pressure of said extracted gas; and
   separating said reduced pressure gas into fractions using a gas separator.

9. A method as recited in claim 8 further comprising the step of:
   using at least one said fraction in a fuel cell.

10. A method as recited in claim 8 further comprising the step of:
    reducing the pressure of at least one said gas fraction in a gas pressure let-down device to produce energy.

11. A method as recited in claim 8 further comprising the steps of:
    reducing the pressure of at least one said gas fraction in a gas pressure let-down device that is coupled to an air compressor;
    using said air compressor to compress air; and
    injecting said compressed air into said gas turbine.

12. A method as recited in claim 1 further comprising the step of: depressurizing said condensate.

13. A system for processing an organic material to produce energy, said system comprising:
    a reactor vessel for hydrothermally treating the organic material with water to produce an effluent;
    a first heat exchanger for cooling said effluent to a temperature sufficient to condense water vapor in said effluent;
    a gas-liquid separator for separating said cooled effluent into a gaseous stream and a residual stream;
    a gas turbine for combusting at least a portion of said gaseous stream to produce energy and waste heat; and
    a second heat exchanger for removing said waste heat from said gas turbine and using said waste heat to preheat the organic material.

14. A system as recited in claim 13 further comprising a means for passing the organic material directly through said first heat exchanger to preheat the organic material prior to introducing the organic material into said reactor vessel.

15. A system as recited in claim 13 further comprising:
    a third heat exchanger for preheating the organic material prior to introduction into said reactor vessel; and
    a means for passing an exchange fluid through said first and third heat exchangers to transfer heat from said effluent to the organic material.

16. A system as recited in claim 13 further comprising:
    a third heat exchanger for preheating the organic material prior to introduction into said reactor vessel; and
    a means for passing an exchange fluid through said second and third heat exchangers to transfer said waste heat from said gas turbine to the organic material prior to introduction into said reactor vessel.

17. A system as recited in claim 13 further comprising:
    a third heat exchanger for preheating the organic material prior to introduction into said reactor vessel; and
    a means for passing an exchange fluid through said first, second and third heat exchangers to transfer said waste heat from said gas turbine and said heat from said effluent to the organic material prior to introduction into said reactor vessel.

18. A system as recited in claim 13 wherein said first heat exchanger is configured to cool said effluent to a temperature below approximately 374° C.

19. A system as recited in claim 13 further comprising:
    a third heat exchanger for using waste heat from said gas turbine to produce steam; and
    a steam turbine for using said steam to produce energy.

20. A system as recited in claim 13 further comprising a means for maintaining the organic material and water at a temperature between approximately 374° C. and approximately 800° C. and a pressure above approximately 25 bar in said reactor vessel to gasify at least a portion of the organic material.

21. A system as recited in claim 13 further comprising a partial pressure reduction valve and a gas separator to depressurize and separate said gaseous stream into fractions.

22. A method for processing feedstock having an organic constituent, said method comprising the steps of:
    introducing said feedstock into a reactor vessel;
    hydrothermally treating said feedstock to produce an effluent containing gases;

cooling said effluent to a temperature sufficient to condense water vapor in said effluent to create a condensate;

extracting gas from said cooled effluent;

introducing said extracted gas into a gas turbine to produce energy and waste heat; and using said waste heat to preheat said feedstock prior to said hydrothermally treating step.

23. A method as recited in claim 22 wherein said feedstock comprises a waste material.

24. A method as recited in claim 22 wherein said feedstock comprises sewage.

25. A method as recited in claim 22 wherein said feedstock comprises municipal solid waste.

26. A method as recited in claim 22 wherein said feedstock comprises biologically digested sewage.

27. A method as recited in claim 22 wherein said feedstock comprises a petroleum based raw material.

28. A method as recited in claim 22 wherein said feedstock is processed to produce a gas product.

29. A method as recited in claim 22 wherein said feedstock is processed to produce a liquid product.

30. A method as recited in claim 22 wherein said feedstock is processed to produce energy.

31. A method as recited in claim 22 wherein said feedstock is processed to convert a hazardous constituent in said feedstock into a non-hazardous constituent.

32. A method as recited in claim 22 further comprising the step of introducing an additive into said reactor vessel.

33. A method as recited in claim 32 wherein said additive is introduced to neutralize said effluent.

34. A method as recited in claim 33 wherein said additive is selected from the group of neutralizers consisting of NaOH, KOH, $Ca(OH)_2$, $H_2SO_4$, $H_3PO_4$, and HCl.

35. A method as recited in claim 34 wherein said waste heat is used to regenerate $Ca(OH)_2$ from $CaCO_3$.

36. A method as recited in claim 32 wherein said additive is introduced to assist salt transport.

37. A method as recited in claim 36 wherein said additive is selected from the group consisting of $H_3PO_4$, $NaH_2PO_4$, $Na_2HPO_4$ and $Na_3PO_4$.

38. A method as recited in claim 36 wherein said additive is an inert solid.

39. A method as recited in claim 32 wherein said additive is a catalyst.

40. A method as recited in claim 32 wherein said additive is a $CO_2$ getter.

41. A method as recited in claim 40 wherein said additive is selected from the group consisting of NaOH, KOH and $Ca(OH)_2$.

42. A method as recited in claim 22 further comprising the step of:

using a catalytic converter to convert said extracted gas prior to introducing said extracted gas into said gas turbine.

43. A method as recited in claim 42 further comprising the step of:

heating said extracted gas prior to catalytic conversion.

44. A method as recited in claim 43 wherein heat from said cooling step is used to heat said extracted gas.

45. A method as recited in claim 42 further comprising the step of:

recovering heat from said converted gas and using said heat to preheat said feedstock.

46. A method as recited in claim 22 further comprising the step of:

recovering heat from said condensate and using said heat to preheat said feedstock.

* * * * *

UNITED STATES PATENT AND TRADEMARK OFFICE
CERTIFICATE OF CORRECTION

PATENT NO. : 6,519,926 B2
DATED : February 18, 2003
INVENTOR(S) : David A. Hazlebeck It is certified that error appears in the above-identified patent and that said Letters Patent is hereby corrected as shown below:

<u>Column 12,</u>
Line 14, delete "residnal" insert -- residual --

Signed and Sealed this

Fifteenth Day of April, 2003

JAMES E. ROGAN
*Director of the United States Patent and Trademark Office*